Sept. 30, 1969   J. MACKLEY   3,469,950
FIXED-BED CATALYTIC OPERATIONS
Filed Nov. 6, 1964   3 Sheets-Sheet 1

INVENTOR,
JACK MACKLEY
BY
MORGAN, FINNEGAN, DURHAM & PINE
ATTORNEYS

Sept. 30, 1969        J. MACKLEY        3,469,950
FIXED-BED CATALYTIC OPERATIONS
Filed Nov. 6, 1964                    3 Sheets-Sheet 2

INVENTOR,
JACK MACKLEY
BY
MORGAN, FINNEGAN, DURHAM & PINE
ATTORNEYS

United States Patent Office 3,469,950
Patented Sept. 30, 1969

3,469,950
FIXED-BED CATALYTIC OPERATIONS
Jack Mackley, Rochester, England, assignor to The British Petroleum Company Limited, London, England, an English company
Filed Nov. 6, 1964, Ser. No. 409,446
Claims priority, application Great Britain, Nov. 21, 1963, 45,995/63
Int. Cl. B01j 9/04
U.S. Cl. 23—288
5 Claims

ABSTRACT OF THE DISCLOSURE

A device for insertion into the catalyst bed of a wholly vapour phase downflow reactor comprises a first perforated tube closed at its lower end which is inserted into the top of the catalyst bed and a cover fitting over the first perforated tube above the level of the catalyst bed, which cover prevents the passage of solid particles into the tube and which is either a second perforated tube open at its lower end but closed at its upper end, or a second imperforate tube open at its upper and lower ends but having around and above its upper end a cowl which defines an annular entry for feedstock vapours, said vapours having to reverse their downward direction of flow and flow upwardly into the annular entry in order to enter the first perforated tube and catalyst bed.

---

This invention relates to apparatus for use in fixed-bed catalytic operations, and particularly apparatus for assisting in the distribution of feed vapours in a downflow, catalyst-containing reactor vessel.

Experience in operating certain catalytic processes, particularly the catalytic desulphurization of petroleum fractions such as, for example, straight-run benzene prior to reforming, has shown that a scale and/or gummy deposit tends to build up on top of the catalyst bed. As this deposit builds up the flow of vapours downwardly through the catalyst bed is progressively hindered, resulting in an increased pressure drop across the reactor and consequently a reduction in unit throughput. Under these conditions it is necessary, periodically, to shut down the unit in order to regenerate the catalyst by burning off the deposit even though the catalytic activity of the bulk of the catalyst bed remains high. This results in a high loss of on-stream time as well as high consumption of regenerating gas, electric power and other utilities, i.e. high utility consumptions in operating the frequent regenerations.

The blocking deposits are caused, it is believed, by a combination of cracking and polymerisation side reactions taking place to a limited extent on the surface of the catalyst bed, and the importation of particulate materials with the vapours, for example ferrous scale from plants such as furnace tubes. Coke and a gummy deposit both contribute to the blocking of vapour flow through the bed.

It has been suggested previously to insert a series of open-topped wire mesh cylinders into the catalyst bed extending from the catalyst surface into the bed for a distance of up to 1 foot. Although such an arrangement has led to some improvement, in a relatively short time the deposit again builds up over the tops of the cylinders, bed material also tending to fall into or to cover the tops of the cylinders.

According to the present invention, a device for insertion into the catalyst bed of a down flow reactor comprises a perforated tube, closed to catalyst at least at its lower end, adapted to be inserted into the catalyst bed to a depth less than the total tube length, and adapted to permit the flow of vapour thereinto after the diversion of the direction of flow of at least part of the vapour through an angle of at least 90°, thence through the tube into the catalyst bed.

The tube is conveniently constructed of wire mesh and is preferably cylindrical in form and may comprise two parts, each part being a cylinder with one wholly open end. The open ends of the two parts are preferably push fitted together, the joint preferably being at or near the middle of the tube. Desirably, a length of the tube near the middle thereof may be defined by a cylinder of imperforate sheet metal, known as a blanking plate. According to another embodiment of the invention, the device may comprise a lower perforated, preferably mesh, tube having its upper end wholly open, and an open ended upper tube of imperforate sheet metal fitted over the lower tube, the upper end of the upper tube being open and surrounded by a cowl so that vapours may pass down the cylinder after entering the cowl by reversing their direction of flow.

A number of the devices outlined may be inserted in the catalyst bed, preferably to a depth equal to about half their length, i.e., to the level of the blanking plate on the non-cowled type and to the lower level of the cowled cylinder on the cowled type.

The devices, or baskets as they may be called, are supported in the main by the catalyst bed but may be additionally supported by strips and support rings to maintain their relative positions with respect to one another.

The baskets are preferably formed of a material suitably resistant to the process conditions experienced in the reactor, for example stainless steel.

By using baskets of the type according to the present invention the intervals between successive catalyst regenerations can be lengthened by factors of 4 and 5 times or even more. When using the baskets of the present invention scale particles—particularly ferrous sulphide, tend, due to the change in direction of the vapour flow, to fall out of the vapours and to deposit on the exposed horizontal catalyst surface. If the upper end of the basket is open some scale will enter the basket, and preferably therefore the upper end of the basket is substantially closed to particulate matter while permitting vapour flow by, for example, a mesh construction. Alternatively the upper end of the basket may be completely blanked off, for example by an imperforate plate, to avoid any possibility of small particles passing therethrough and to ensure that an even higher proportion of vapour is diverted through at least 90° in order to enter the basket through either the perforated side walls or through the cowl according to type.

Although scale deposits build up on the catalyst surface between baskets, vapours still have access to the catalyst bed via the interior of the baskets. Such deposits are prevented from passing through the mesh at the catalyst surface by the blanking plate in the case of the non-cowled type basket, or by the solid wall of the cowled type.

Although deposition of material caused by cracking and polymerization is not prevented by the baskets, this type of deposition now occurs largely at the interface of the baskets and catalyst. Because of the very much greater surface area of contact afforded between vapour and catalyst by the mesh baskets, blockage takes proportionately longer.

By using the cowled type basket, fallout of solid particles from the incoming vapours is assisted by the turning of the vapour stream through 180° to enter the cowl as opposed to 90° in order to enter the mesh of the non-cowled basket.

The number and dimensions, i.e., length, cross-section and mesh size, of baskets ideally employed in a reactor will depend upon the reactor itself and the process conditions prevailing therein, particularly the flow velocity in the catalyst bed. The aim in designing a set of baskets for a given reactor is to provide sufficient baskets to minimise the increase in velocity over the bed with its attendent pressure drop, whilst maintaining an adequate area of bed surface on which the deposits may build up.

With the cowled type basket, the cowl annular entry area is preferably approximately equal to the down flow area of the basket. Mesh effective entry areas on the non-cowled, i.e., substantially wholly mesh, type and the effective exit areas on the lower parts of the baskets of both types are desirably sized to permit up to approximately 50% blockage by fine deposits within the baskets before a restriction of vapor passage commences.

Depending on the size of reactor within the range of diameters of 6 to 8 feet, baskets may be up to 3 feet long, up to 6 inches diameter, and may cover up to 30% of the reactor cross-section area. Suitable mesh sizes range between 8 x 8 x 18 S.W.G. and 8 x 8 x 16 S.W.G.

Devices according to the present invention are particularly useful in hydrofining processes for the desulphurization of petroleum fractions, particularly low boiling petroleum fractions such as naphthas. Hydrofining is normally carried out by catalytically treating the fraction concerned at 400–850° F. and 50–1,500 p.s.i.g. at a space velocity of 0.5 to 20 v./v./hr. with 200–5,000 s.c.f./b. of hydrogen. Catalysts suitable for use in such a process may comprise oxides of Group VIa and VIII of the Periodic Table upported on a refractory oxide support, for example cobalt and molybdenum oxides supported on alumina. The present invention includes such a hydrofining process wherein the device hereinbefore described is employed.

The invention is illustrated with particular reference to the accompanying drawings, FIGURES 1 to 5.

Figure 1:
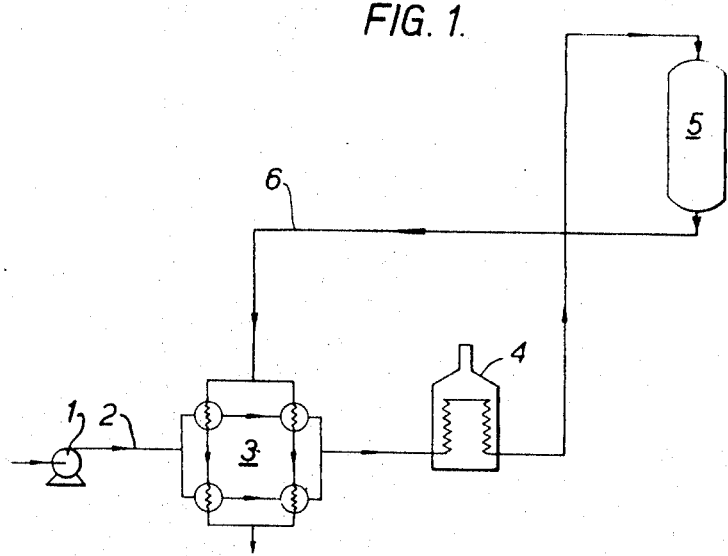
FIGURE 1 is a schematic diagram of a typical desulphuriser used for desulphurising the benzene feedstock to a catalytic reformer.
Figure 4:
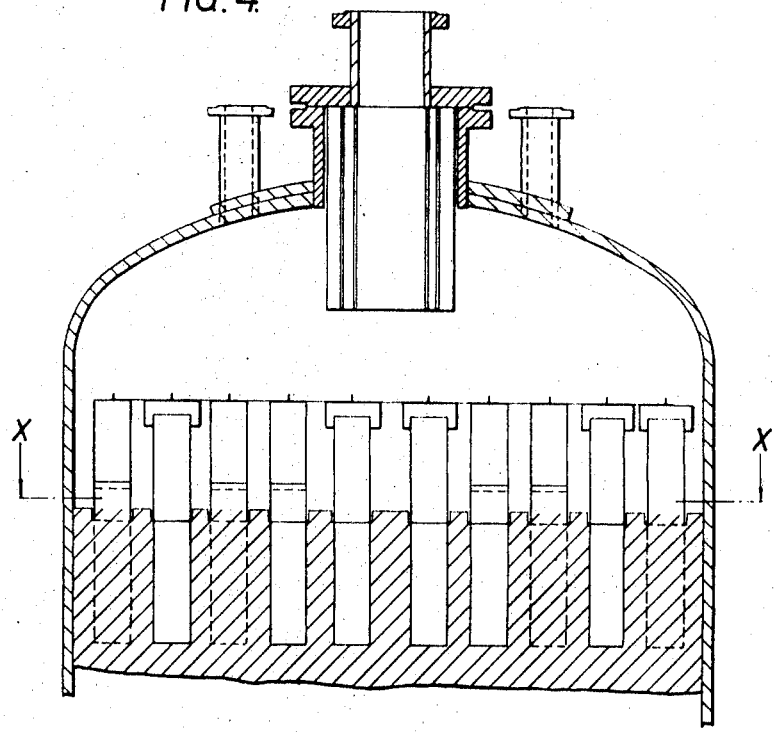
FIGURE 4 is a side view, partly in section, of a reactor containing a set of baskets comprising both wholly mesh and cowled type baskets.

In FIGURE 1, feed passes from pump 1 through line 2, the shell side of heat exchangers 3, heater 4 to reactor 5. The desulphurised product passes from the reactor through the tube side of exchangers 3 via line 6 to coolers etc. (not shown).

Figure 2:
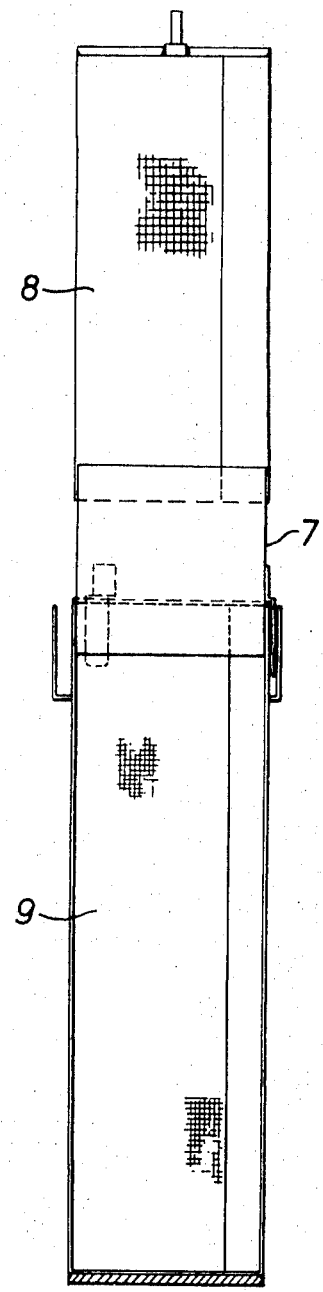
FIGURE 2 is a side view of a basket of substantially wholly mesh construction.

FIGURE 2 shows a basket construction of wholly mesh construction apart from blanking plate 7, which is of steel plate, and comprising upper basket 8 and lower basket 9.

Figure 3:
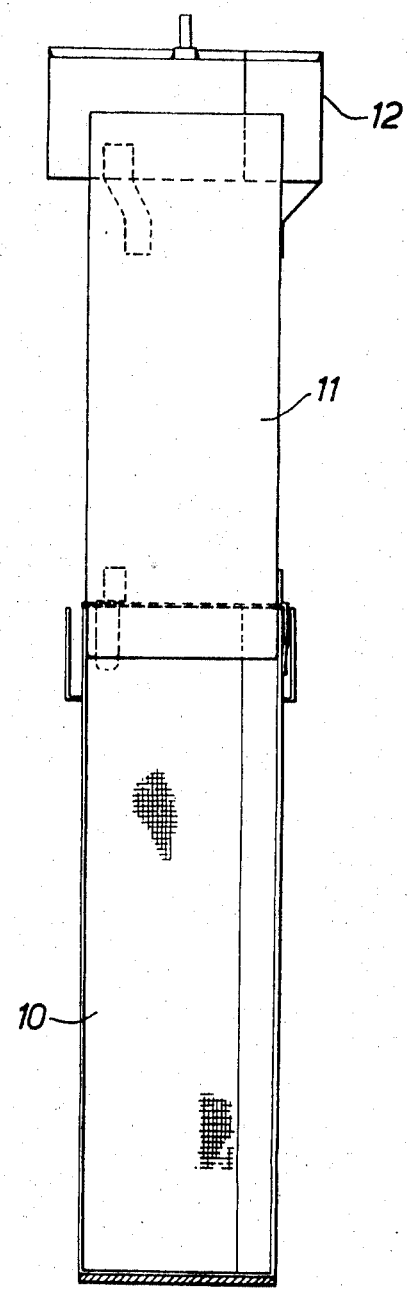
FIGURE 3 is a side view of a basket of cowled construction.
Figure 5:
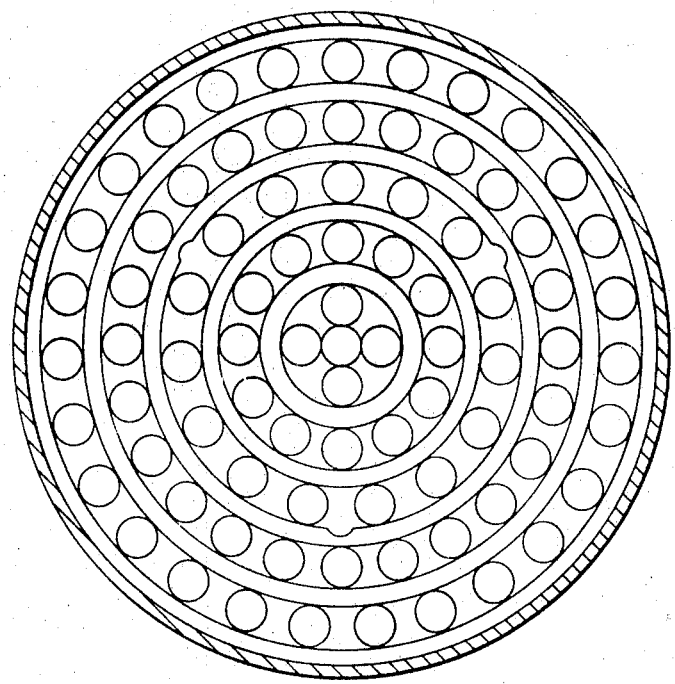
FIGURE 5 is a plan view from above of the reactor in section along the line X—X of FIGURE 4.

FIGURE 3 shows a cowled basket comprising lower, mesh, basket 10, steel plate upper basket 11, and surmounted by cowl 12.

By means of the baskets illustrated in FIGURES 2–5 the time between regenerations was raised to 16 months compared with 3 months in a unit not employing these baskets.

I claim:

1. A device for assisting in the distribution of feed vapours in a wholly vapour phase, down-flow, catalyst-containing reactor vessel comprising a tube open at both ends inserted in the top of the catalyst bed, said tube having a first tube portion extending downwardly from the level of said bed, a second perforated tube portion extending upwardly from said level, and a cylinder of imperforate sheet metal at the level of the catalyst bed, said cylinder forming a blanking plate for preventing scale deposits built up on the surface of the catalyst bed between tube portions from passing into the interior of the tube at the catalyst bed surface, said first tube portion being perforated for the flow therethrough laterally into the catalyst bed of feed vapours supplied from said second portion, said first tube portion also having closure means at its lower end for closing the lower open end of said tube to catalyst, baffle means in supported relationship with said second tube portion proximate the upper end thereof and forming therewith a unitary cover for said second tube portion for closing the upper open end of said second tube to the entry of particulate matter contained in feed vapors impinging upon said baffle means and for diverting said vapours outwardly of the tube axis.

2. The device of claim 1 wherein the first and second portions are constructed of wire mesh.

3. A device for assisting in the distribution of feed vapours in a wholly vapour phase, down-flow, catalyst-containing reactor vessel comprising a tube open at both ends inserted in the top of the catalyst bed, said tube having a first tube portion extending downwardly from the level of said catalyst bed and a second tube portion extend upwardly from said level, said first tube portion being perforated for the flow therethrough laterally into the catalyst bed of said vapors supplied from said second tube portion, said first tube portion also having closure means at its lower end for closing the lower end of said tube to catalyst, said second tube portion being imperforate and having its upper end open for passage of vapours thereinto, and baffle means for said second tube portion, said baffle including a cowl in annularly spaced relation to said second tube portion and overlying the open end thereof in vertically spaced relation for substantially closing said open end of said second tube portion to the entry of particulate matter contained in feed vapours impinging upon said cowl and for diverting said vapours outwardly of the tube axis, said cowl defining an annular entry for feedstock vapours and serving to reverse the downward direction of flow of the vapours and cause said vapours to flow upwardly through the annular entry into the open end of said second tube portion.

4. The device of claim 3 wherein said tube portions are cylindrical and each has one wholly open end, said tube portions being telescopically joined together at said open ends, the joint formed being substantially midway of the length of the tube.

5. The device of claim 3 wherein the area of said annular entry is substantially equal to the down-flow area of said second tube portion.

References Cited

UNITED STATES PATENTS

| | | | |
|---|---|---|---|
| 2,276,340 | 3/1942 | Prickett et al. | 23—288 |
| 2,279,153 | 4/1942 | Wilcox | 23—288 X |
| 2,369,478 | 2/1945 | Mekler et al. | 23—288 |
| 2,961,304 | 11/1960 | Collins | 23—288 |
| 3,006,740 | 10/1961 | Maggio | 23—288 |
| 3,112,256 | 11/1963 | Young et al. | 23—288 X |
| 3,146,189 | 8/1964 | Kunreuther et al. | 23—288 X |
| 3,255,159 | 6/1966 | Frandsen | 23—288 |

MORRIS O. WOLK, Primary Examiner

D. G. CONLIN, Assistant Examiner

U.S. Cl. X.R.

23—289

UNITED STATES PATENT OFFICE
CERTIFICATE OF CORRECTION

Patent No. 3,469,950 September 30, 1969

Jack Mackley

It is certified that error appears in the above identified patent and that said Letters Patent are hereby corrected as shown below:

Column 3, line 32, for "upported" read -- supported --.
Column 4, line 28, for "extend" read -- extending --.

Signed and sealed this 17th day of February 1970.

(SEAL)
Attest:

Edward M. Fletcher, Jr.
Attesting Officer

WILLIAM E. SCHUYLER, J.
Commissioner of Patent